(12) United States Patent
Wehrli et al.

(10) Patent No.: US 6,920,370 B2
(45) Date of Patent: Jul. 19, 2005

(54) METHOD AND DEVICE FOR DISTURBANCE SENSING, ESPECIALLY COLLISION SENSING, IN THE DRIVE SYSTEM OF A NUMERICALLY CONTROLLED MACHINE TOOL

(75) Inventors: Peter Wehrli, Ascona (CH); Orio Sargenti, Quartino (CH)

(73) Assignee: Agie SA, Losone (CH)

( * ) Notice: Subject to any disclaimer, the term of this patent is extended or adjusted under 35 U.S.C. 154(b) by 151 days.

(21) Appl. No.: 09/738,181

(22) Filed: Dec. 15, 2000

(65) Prior Publication Data

US 2001/0012973 A1 Aug. 9, 2001

(30) Foreign Application Priority Data

Dec. 16, 1999 (DE) .......................... 199 06 834

(51) Int. Cl.[7] .............................................. G06F 19/00
(52) U.S. Cl. ....................................... 700/177; 700/255
(58) Field of Search ................................ 700/177, 255, 700/175, 57, 61, 69, 167, 193, 297, 302; 33/710; 356/616, 620; 483/13

(56) References Cited

U.S. PATENT DOCUMENTS

| | | | | |
|---|---|---|---|---|
| 4,049,942 A | * | 9/1977 | Balleys et al. ............ 219/69.17 |
| 4,150,275 A | * | 4/1979 | Wavre ........................ 219/69.2 |
| 4,392,195 A | * | 7/1983 | Inoue ........................... 700/162 |
| 4,603,391 A | * | 7/1986 | Inoue et al. ................. 700/162 |
| 4,608,654 A | * | 8/1986 | Schafsteller ................ 700/302 |
| 4,733,343 A | * | 3/1988 | Yoneda et al. ................. 700/79 |
| 4,748,554 A | * | 5/1988 | Gebauer et al. ............. 700/174 |
| 5,118,914 A | | 6/1992 | Girardin et al. |
| 5,170,358 A | * | 12/1992 | Delio .......................... 700/177 |
| 5,414,632 A | * | 5/1995 | Mochizuki et al. ......... 700/174 |
| 5,587,915 A | * | 12/1996 | Nagatomi .................... 700/177 |
| 5,719,479 A | * | 2/1998 | Kato et al. ................... 318/563 |
| 5,895,177 A | * | 4/1999 | Iwai et al. .................. 408/1 R |
| 5,969,817 A | * | 10/1999 | Ohsawa ....................... 356/363 |
| 6,022,132 A | * | 2/2000 | Schulz ........................ 700/186 |
| 6,486,429 B1 | * | 11/2002 | Wehrli et al. ............. 219/69.11 |

FOREIGN PATENT DOCUMENTS

| | | |
|---|---|---|
| DE | 3408173 A1 | 9/1985 |
| DE | 3426863 A1 | 1/1986 |
| DE | 3741973 C2 | 1/1991 |
| DE | 196 34 145 A1 | 2/1997 |
| DE | 196 00 538 A1 | 7/1997 |
| JP | 6-4206 | 1/1994 |

* cited by examiner

Primary Examiner—Leo Picard
Assistant Examiner—Carlos Ortiz Rodriguez
(74) Attorney, Agent, or Firm—Marshall, Gerstein & Borun LLP

(57) ABSTRACT

A method and device for disturbance sensing in the drive system of a numerically controlled machine tool or similar device is disclosed, in which at least one drive motor for positioning of a machine part being moved such as an advance slide or an X/Y cross-slide is coupled via one or more transmission elements in which the position of the moving machine part is measured directly on the machine part and also indirectly in at least one location in the transmission chain. Direct and indirect position measured values are compared and the measured value comparison value is used to record a disturbance with consideration of the actual operating conditions, such as machining speed and acceleration/delay, optionally moved masses and machine-specific process forces upon fulfillment of a specific criterion.

18 Claims, 2 Drawing Sheets

METHOD AND DEVICE FOR DISTURBANCE SENSING, ESPECIALLY COLLISION SENSING, IN THE DRIVE SYSTEM OF A NUMERICALLY CONTROLLED MACHINE TOOL

FIELD OF THE INVENTION

The present method and device concerns disturbance sensing, and, more particularly recognition and evaluation of disturbances in a drive system of a numerically controlled machine tool.

BACKGROUND OF THE INVENTION

It is particularly important in industrial use of machine tools that they run as free of disturbance as possible with low monitoring and maintenance demands. Any defects in the machine and/or disturbances during machining lead to undesired downtimes and even to demanding and cost-intensive repairs connected with economic loss from shutdown of the machine tool. A disturbance of a special type in this context is undesirable collision between the moving machine parts of the machine tool, for example, the tool or work table and the work piece being machined, as well as machine parts situated in their surroundings, like clamping devices to attach the work piece to the work table, parts of the work table itself or of the machine frame, devices to supply current to the work zone, rinsing agents, devices for smoke and dust removal, protruding parts of the work piece being machined or work pieces already machined on a pallet, especially drop-out pieces. The mentioned clamping devices are particularly critical and restrictive for motion freedom of the tool. Depending on the size and number of work pieces clamped in the work zone, differently shaped clamping devices in different numbers are arranged in the work zone and all are not fully examinable by the operating personal, for which reason collisions can occur from incorrect operation manual operation or incorrect programming in automatic operation.

Various methods to protect against such interferences, especially collision protection methods, are known from the prior art. However, they do not offer a satisfactory solution in terms of practical suitability, cost/benefit ratio and long-term behavior.

Preventive methods wherein the machine tool is equipped with collision detectors, which are connected to the machine control, to recognize any hazardous situation, and, when necessary, stop the advance movement of the tool electrode are among known collision protection methods. An example of such a method is described in U.S. Pat. No. 5,118,914, wherein a pressure sensor arranged on the tool head of the machine in the event of a collision initiates interruption of relative movement between the machine head and the obstacle when a stipulated threshold pressure is surpassed. Comparable collision recognition by means of a capacitive sensor arranged on the work head is known from Japanese Publication JP 6-4206. Scanning systems in the work space of a machine tool also belong in the category of preventive collision protection systems, as well as image-processing systems, and are based on the principle of radiation reflection. These preventive methods, however, have the drawback that they are relatively expensive because of the required additional sensors and are unsuitable with reference to long-term behavior because of soiling or wear of the sensors.

On the other hand, reactive disturbance protection methods are also known. In these methods a disturbance (e.g., a collision situation) occurs first and interruption of advance movement is then immediately initiated via the machine control. In a known method of this category in the field of electric discharge machining (EDM), the drive current fed to the machining electrode is monitored during machining and on occurrence of a sharp rise in drive current, which indicates a collision, interruption of axial movements is initiated.

Another collision protection method is taught in German reference DE 196 00 538 A1 in conjunction with EDM in which the machine operator establishes forbidden and permitted zones in the control before machining so that the control only permits advance movements into the permitted zones in which it is assumed that no collisions occur. This method is relatively cost-effective, but requires from the machine operator a high degree of readiness and attention in order to correctly program the permitted zones. However, in complex machining, especially of several work pieces, this is not always possible with absolute correctness.

The combination of direct and indirect position measurement systems is known from German reference DE 34 26 863 A1 in conjunction with position regulation of a positioning drive of a numerically controlled machine tool. A first direct length measurement system is then arranged on the machine part being moved by a drive motor and an indirect position measurement system mechanically coupled to the drive motor is additionally provided. The measured values of the two position measurement systems are used for different improvements in the context of position regulation, such as accurate stop by backup of the indirect measurement with higher resolution and an increase in control accuracy in the context of interpolation, for example. However, there is no mention of applications in the direction of disturbance sensing.

OVERVIEW OF THE DISCLOSED DEVICE

The teachings of the disclosed device and method concern, in part, simple and effective protection against disturbances, especially collisions, in the drive system of a machine tool or similar device.

A method is disclosed for disturbance sensing in the drive system of a numerically controlled machine tool in which at least one drive motor for positioning of a machine part being moved, which moves, for example, a work piece and/or a tool of the machine tool (e.g., an advance slide or an X/Y cross slide), is coupled via one or more transmission elements in which: (a) the position of the moved machine part is measured directly in the machine part and additionally indirectly on at least one additional location of the transmission chain; (b) the direct and indirect position measured values are compared; and (c) the measured value comparison value is used to sense a disturbance with consideration of the current operating conditions such as the machining speed and acceleration/delay, any moving masses, and machine-specific process forces with fulfillment of a prescribed criterion. Direct position measurement here means measurement on or in the immediate vicinity of the moving machine part. A corresponding device for disturbance sensing in the drive system comprises a direct measurement system, which is connected to the machine part being moved by the drive motor, to measure the actual position of the machine part being moved, an indirect measurement system for indirect determination of the position of the moving machine part at at least one additional site of the transmission chain and a control unit to compare the determined position measured values and to establish a disturbance when the measured value comparison value meets a prescribed criterion.

Preferably, only two or more measurements of the position of the moving machine part at different sites of the transmission chain between the drive motor and machine part are therefore carried out for disturbance sensing. The resulting measured value comparison value is a highly sensitive indicator of whether a disturbance has occurred in the drive motor itself or in the transmission and advance mechanism lying in between and/or on the moving machine part itself or a disturbance that was induced from the outside in the drive system. Disturbances in the drive system can be caused by a mechanical defect (e.g., a defect in the advance mechanism), electronic problems (e.g., problems in the drive motor) or by wear phenomena in the transmission chain, such as play induced by friction, heating or deformation. A disturbance induced from the outside in the drive system is often caused by a collision of the moving machine part with an obstacle in the work space of the machine tool.

All these disturbance phenomena result in a displacement or deviation of the actual (absolute) position of the moving machine part, which is determined in the preferred method and device directly or in the immediate vicinity of the machine part that the work piece or tool moves, relative to the machine part position recorded indirectly at one or more sites of the transmission chain and derived with knowledge of the transmission behavior. If the deviation between the directly and indirectly determined position meets a prescribed criterion depending on the situation, the drive or axis control of the machine tool establishes a specific disorder and immediately initiates the appropriate countermeasures (e.g., interrupts axial movement in the case of a collision).

As mentioned above, the position of the moving machine part can also be indirectly determined at several sites of the transmission chain so that a dynamic disturbance along the transmission chain of the drive system of the machine tool can also be recognized as a disturbance criterion even before occurrence of the actual disturbance.

In another example, indirect measurement of the position of the machine part being moved is conducted directly on the drive motor. For this purpose, a rotation angle sensor connected to the rotor shaft of the drive motor is used, such as an optical, inductive or capacitive rotation angle sensor or a resolver, for example. The second direct measurement system to record the absolute machine part position is a linear measurement system connected to the moving machine part, such as a tool head or X/Y cross table, for example, with particular preference for an optical length measurement system, a phase grating length measurement system or an inductive or capacitive linear measurement system of high measurement accuracy. The advantages of these two measurement systems are therefore exploited in the disturbance sensing of the disclosed method, namely the excellent dynamics of the indirect rotatory measurement system on the drive motor, on the one hand, and the high position accuracy of an optical length measurement system, for example, for direct position measurement of the moving machine part, on the other hand. A further advantage is that a large portion of the servomotors now in use as drive motors have an integrated rotation angle sensor, which is ordinarily used for position control in the drive system of machine tools. If both measurement systems are used to improve position control, as disclosed, for example, in German Document DE 34 26 863 A1, in addition to effective disturbance determination, excellent machining precision is achieved. This applies primarily to machine tools, especially EDM machines, having high accuracy requirements that need protection from disturbances.

The sensitivity for sensing any disturbances in the drive system is also naturally greatest when the position of the machine part is measured at the beginning of the transmission chain, (i.e., directly on the drive motor) and likewise at the end of the transmission chain (i.e., on the machine part itself). Any disturbance within the transmission chain or acting on the transmission chain from the outside then causes a displacement in the actual machine part position relative to the position recorded, for example, with the rotation angle sensor of a servomotor.

In the previous example, the direct measurement system is used to monitor a translatory movement of a machine part. However, the direct measurement system can likewise be used to monitor the rotational axes of a machine tool. In this case, direct measurement preferably also occurs with a rotation angle sensor, such as an optical, inductive or capacitive rotation angle sensor connected to a rotational axis, for example.

The difference value of the direct and indirect position measured values is preferably used as a criterion for recognition of a disturbance. The difference value represents a quantity that is easy to determine in terms of apparatus and at the same time is reliable and sensitive with respect to undesired disturbances in the drive system. Relative to the current monitoring mentioned in the introduction in conjunction with a known collision protection method, the position difference value is much more sensitive to a disturbance in the drive system. Owing to the excellent dynamics, for example, of rotation sensor measurement systems, the control can react immediately and initiate appropriate countermeasures on occurrence of a measured value difference or a change in measured value difference.

The determined position difference value from direct and indirect measurement is preferably compared with one or more prescribed threshold values, which are determined with consideration of the actual operating conditions, especially inertial forces during acceleration/delay of the moving part, process forces of work piece machining and/or friction forces in the drive system, and the appropriate measures are automatically initiated on reaching or surpassing the threshold value, such as interruption or reversal of the advance movement, if necessary, and reduction of the process parameters, such as current, voltage and rinsing pressure. In the case of an advance reversal, the drive system can also preferably be briefly loaded sharply in order to reach a collision-free state as quickly as possible. A qualitative evaluation of a collision is also prescribed in the illustrated method and device, the degree of a possible collision damage being quantified with consideration of the collision direction, the collision speed and/or the so-called collision depth. The values for the collision direction and collision speed can be taken directly from the drive control; and the collision depth, namely the path of the moving machine part from the beginning of the collision to stopping or the reversal point is directly determined with the direct measurement system.

The threshold values for determining a disturbance can be statistically established for each specific machine type and entered in the drive control of the machine. However, threshold values are preferably determined by a calibration procedure in which standard disturbance situations are run and simulated on a specific machine tool and the corresponding deviation between the direct and indirect position measured value is established. This calibration process then considers errors induced in the drive system by manufacturing tolerances and friction effects, in addition to the purely dynamic disturbance effects. With particular advantage, the control of the machine tool provides for repetition of such a calibration procedure at time intervals.

In another example, collision sensing is carried out with reference to the difference value of the direct and indirect position measured values, considering the actual operating conditions. In the event of a collision between the moving machine part and an obstacle in the work space of the machine tool, (such as for example, a clamping device or a protruding section of the work piece being machined), the absolute measured value of the moving machine part determined by the direct measurement system "lags behind" the measured value determined indirectly on the drive motor. An abrupt increase in a difference value between the directly determined and indirectly determined position measured values indicates a collision situation. This is recorded with a highly dynamic indirect measurement system on the rotor shaft of the drive motor or on a rotating shaft in the transmission chain after the drive motor without delay and a corresponding signal sent to the drive control of the advance movement. In reaction to this, the advance movement of the moving machine part is immediately interrupted and, if necessary, returned in the opposite direction on the path covered before the collision, in order to avoid any additional collisions during the return movement. The drive control of the machine tool therefore can react particularly quickly in collisions, namely stop the relative movement between the obstacle and the moving machine part. If a collision does occur, a collision is at least indicated; this method therefore belongs in principle to the category of the reactive methods mentioned in the introduction. Owing to the elasticity of the drive train between the drive motor and the moving machine part, no damage to the machine part or no noticeable consequences occur, or at least only slight ones. During interruption of the advance movement in the event of collision, the elastic deformation of the drive train takes up the collision energy in the fashion of a "crumple zone". By corresponding control of the drive motor, a situation can be achieved in which this absorbed energy is smoothly released at the other end of the drive train. Because of its reactive nature, the disclosed collision protection method is particularly suitable for machine tools with low advance speeds. EDM machines can be mentioned as examples, in which the maximum machining speeds are generally in the range of 10 mm/min.

Positioning speeds of a few meters per minute, however, can also be used in EDM or similar machines. It is therefore advantageous in such high-speed machine tools to combine the disclosed collision protection method with a preventive collision protection method of the type mentioned in the introduction. The machining process is then primarily monitored by means of an active collision protection system for any collision and disengagement or reversal of the advance movement carried out on occurrence of a collision risk. Only if the primary method fails, is the collision protection of the illustrated system activated as a secondary method.

In yet another example, the machine tool has an inductive or optical proximity sensor, that serves as primary collision protection system. If this fails or does not function for other reasons (e.g., "dead angle"), and a collision occurs, the aforementioned collision protection recognition is activated as a secondary method. In an alternative example, the active protection system is an image processing system, which recognizes size and position of elements situated in the work space of the machine tool (e.g., work pieces, clamping devices, etc.), and restricts the travel of the axial controls, accordingly. If this primary system fails, a secondary collision protection such as one of the examples disclosed herein is then activated.

BRIEF DESCRIPTION OF THE DRAWINGS

Other advantages and features of the illustrated system are apparent from the following description in conjunction with the accompanying schematic drawings.

DETAILED DESCRIPTION OF THE PREFERRED EMBODIMENTS

The present disclosed method and the corresponding device for disturbance recognition are described below in conjunction with a drive or axial drive system of a cavity sinking machine. However, this is not to be understood as restrictive, since the disclosed system has broad application for all types of machine tools, like milling, drilling and cutting machines, for example, in which comparable disturbances can occur in or on the axial drive system of the machine.

Figure 1:
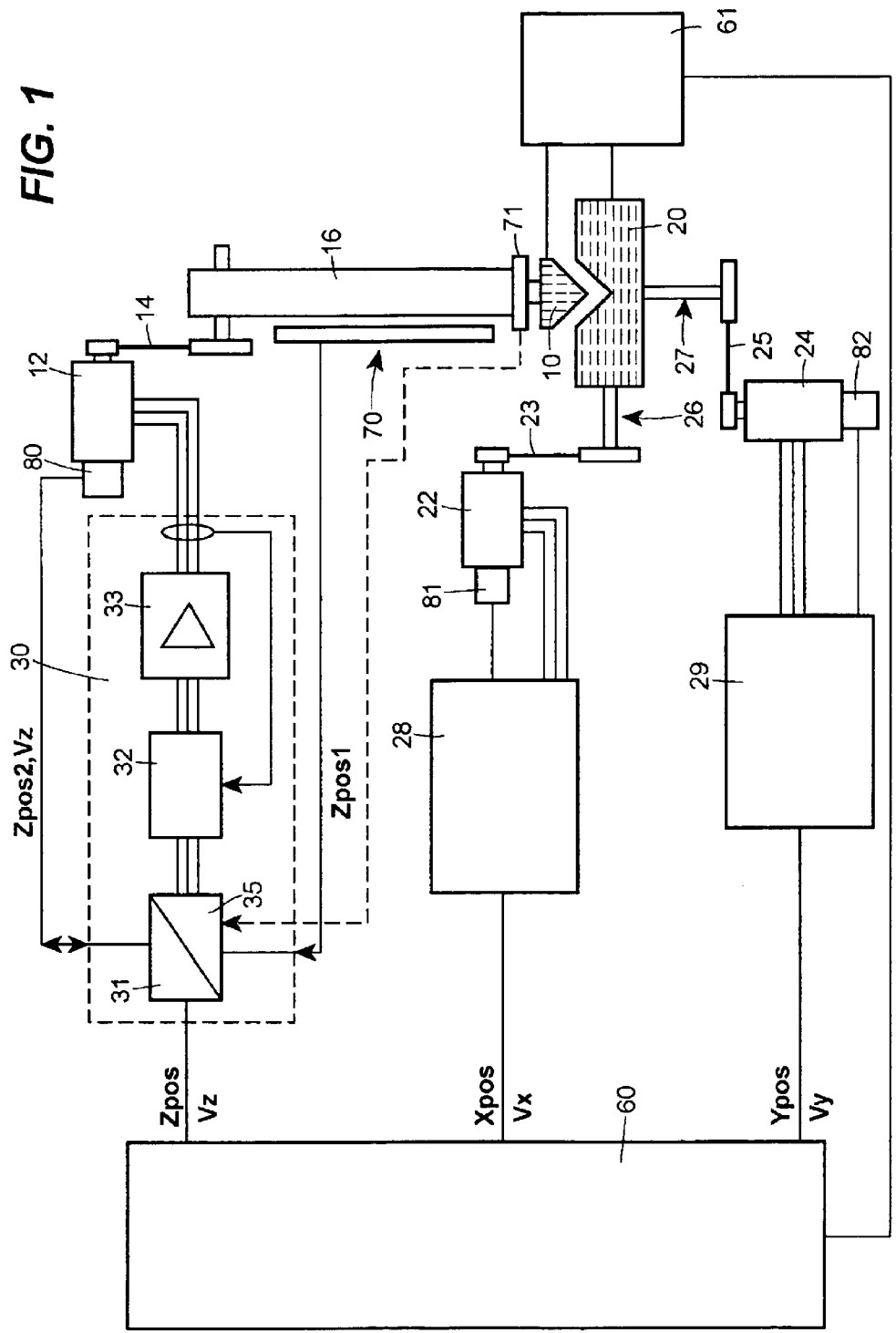
FIG. 1 shows a schematic view of the X/Y/Z axial drive system of a die sinking machine with the measurement system constructed in accordance with the teaching of the invention.

The primary components of an X/Y/Z drive system of a cavity-sinking machine are shown in the block diagram of FIG. 1. Other conventional components of the cavity-sinking machine, such as a machine frame, a rinsing system, and a tool table are not shown since they are not necessary for understanding the present system and are also of known design. A drive system is provided for each of the three main axes in the X, Y and Z direction. For the Z axis to control the advance movement of a cavity-sinking electrode 10 in the Z direction, the drive system consists of a servomotor 12 (e.g., an induction motor), that is coupled on the output side to an advance mechanism 16 including of several transmission elements to convert the rotational movement of servomotor 12 into a linear movement via a V belt or toothed belt 14. An example of such an advance and transmission mechanism 16 is further explained later in conjunction with FIG. 2. The cavity-sinking electrode 10 is mounted on the front free end of the advance mechanism 16 and subjects a work piece 20 clamped onto a work table (not shown) to cavity sinking. The drive systems for the X and Y axes are designed similarly. A servomotor 22 and 24 is also provided for each axis, each of which is coupled to an X-advance mechanism 26 or a Y-advance mechanism 27 via V or toothed belts 23 and 25. The X and Y advance mechanisms 26, 27 are only shown schematically in FIG. 1. In practice they are preferably coupled to each other in series and generally comprise a Cartesian X/Y cross-table with cross-coupled X and Y movement slides. The work piece 20 is moved in the X/Y plane relative to the cavity-sinking electrode 10 via this X/Y cross table.

Each of the X/Y/Z drive systems has its own axial, control unit, namely an axial control unit 28 for the X drive, an axial control unit 29 for the Y drive and an axial control unit 30 for the Z drive, which control the advance movement of the cavity-sinking electrode 10 that determines the sinking contour and optionally a relative movement in the X/Y plane between the cavity-sinking electrode 10 and the work piece 20, necessary for cavity-sinking machining of work piece 20. For this purpose, the X, Y and Z axial control units 28, 29 and 30 issue the corresponding position signals to the servomotors 12, 22, 24. The position data for generation of the X, Y and Z adjustment signals are obtained from the axial control units 28, 29 and 30 of a central computerized numerical control (CNC) unit 60 of the cavity-sinking machine. The programmed path and contour data or the data obtained from a superordinate computer are preferably subjected in the CNC control unit 60 to fine interpolation and optionally a path correction procedure and then issued in the form of position signals $X_{pos}$, $Y_{pos}$ and $Z_{pos}$ to the corresponding X, Y and Z axial control units 28, 29 and 30. The CNC control unit 60 of the cavity-sinking machine is also connected to a generator and process control unit 61, which controls the actual machining conditions such as machining current, machining voltage, pulse pause times and rinsing. From these quantities the CNC control unit 60 produces the actual path speed and advance speed data, which are sent as speed signals $V_X$, $V_Y$ and $V_Z$ to the corresponding axial control units 28, 29 and 30 for position and speed control.

By measuring a position established by a drive system at different, but at least two, locations of a mechanical transmission chain of the drive system, disturbances are recorded and appropriate countermeasures initiated. As is apparent from FIG. 1, two measurement systems are provided for the Z drive system to determine the Z position of the cavity-sinking electrode 10 or better the position of a slide of the Z advance mechanism 16 (cf. FIG. 2) carrying this cavity-sinking electrode 10. For a position measurement, a linear measurement system 70 is arranged parallel to the advance mechanism 16 (i.e., parallel to the path of the slide being moved), which directly measures the absolute position of the Z advance mechanism 16 and transmits a position measurement signal $Z_{pos1}$ to the Z axial control unit 30. A preferred variant of the linear measurement system 70 is shown in detail in FIG. 2. In addition, an indirect rotation measurement system 80 is coupled to the rotor shaft of servomotor 12, which can be an inductive resolver, an incremental encoder or any other type of dynamic and high-resolution rotation angle sensor. The Z position of the slide of the Z advance mechanism 16 is determined by such a rotation angle sensor 80 and therefore the Z position of the cavity-sinking electrode 10 is determined indirectly, wherein the corresponding rotor position of servomotor 12 is measured and, with consideration of the transmission behavior of toothed belt 14 and the transmission and advance mechanism 16 (e.g., the slope of a spindle drive), closed to the corresponding Z position of the Z advance mechanism 16. The Z axial control unit 30 also obtains a Z position measurement signal $Z_{pos2}$ from the rotation angle sensor 80.

The measurement resolution of the indirect measurement system 80 is preferably several factors greater than that of the direct linear measurement system 70 so that the indirect measurement system 80 is best suited for position control of the Z advance movement. However, cases are also conceivable in which position control is conducted only with the direct linear measurement system 70 or to improve the control accuracy by a combination of measurement systems 70 and 80, as proposed, for example, in German reference DE 34 26 863 A1. During a position control with linear measurement systems 70, the control loop includes the entire transmission chain so that any transmission error of the mechanism is recognized by the length measurement system 70 and adjusted by the control electronics. For position and speed control of the Z advance, the Z axial control unit 30 has a Proportional, Integral, Derivative (PID) position and speed controller 31 in which the position measurement signals $Z_{pos2}$ and corresponding speed signals $v_z$ are fed back for dynamic control from the rotation angle sensor 80 and the position measurement signal $Z_{pos1}$ from the linear measurement system 70 for improvement of the control accuracy. A PID current controller 32 and an amplifier 33 to transmit the control signals to the servomotor 12 are connected after the PID controller 31. Status control also occurs via a current feedback loop in the PID current controller 32.

The X and Y axial control units 28, 29 are designed similarly to the Z axial control unit 30. The servomotors 22 and 24 likewise have rotation angle sensors 81, 82 for indirect measurement of the position of the machine part being moved (i.e., the X table or the Y table). This position measurement is used for dynamic position control. An additional direct position measurement, however, is not prescribed in the X and Y drive system.

The illustrated practical example uses the combination of direct and indirect measurement of the adjusted Z position by the linear measurement system 70 (at the end of the transmission chain) and rotation angle sensor 80 (at the beginning of the transmission chain) to record possible disturbances in the Z drive system of the cavity-sinking machine.

Any disturbances within the transmission chain from the servomotor 12 to the slide of the advance mechanism 16 or disturbances induced from the outside on the Z advance cause a displacement of the absolute position $Z_{pos1}$ of the Z advance mechanism 16 relative to the position $Z_{pos2}$ indirectly recorded with the rotation angle sensor 80 (i.e., the direct measured value $Z_{pos1}$ generally "lags behind" the indirect measured value $Z_{pos2}$). A difference between the position measured value $Z_{pos2}-Z_{pos1}=\Delta$ is used as criterion for the occurrence of an error function or a disturbance in the Z drive system. For example, mechanical defects or play, loosening or elasticities can occur over time from wear or material fatigue in the transmission and advance mechanism 16 or electrical defects in the servomotor 12. However, improper operation of the Z drive system is often also caused by a collision between the cavity-sinking electrode 10 and the work piece 20 or another obstacle in the work space of the cavity-sinking machine. On occurrence of a collision, the position difference value $\Delta$ increases rapidly at the moment of collision. This difference value is continuously determined by a computer unit 35 provided in the Z axial control unit 30 and compared with threshold values $\Delta_{thres}$ entered in the computer unit 35. If the determined difference value $\Delta$ reaches or surpasses a prescribed threshold value or the determined difference value rise surpasses a prescribed threshold value increase, the Z axial control unit 30 generates an interruption signal for servomotor 12 so that the Z advance movement is immediately stopped and in specific cases moved back on the motion path before the collision to a collision-free state based on an additional control signal from the computer unit 35.

The position difference value $\Delta$ provides a very reliable and sensitive quantity for the occurrence of a collision. Owing to the high measurement accuracy and the good dynamics of the indirect measurement system 80 on servomotor 12, the Z axial control 30, upon sensing a collision, can react without delay and interrupt the advance movement. Only elastic deformations of the drive train generally occur in a collision, but no serious consequences on the machine or work piece, so that the cavity-sinking machine can be operated again immediately without shutdown. The threshold values for the position difference values $\Delta$ entered in the computer unit 35 can be determined, for example, from statistics or individually for a specific machine by running standard collision situations. In the last-named calibration procedure, in addition to the purely dynamic disturbance effects, manufacturing tolerances and friction effects are also considered in the Z transmission and advance mechanism. To run such calibration cycles, which can be repeated at time intervals, the computer unit 35 of Z axial control unit 30 has appropriate control modules.

In establishing the threshold value or threshold value trend for the difference Δ, the actual machining conditions are also considered, especially the instantaneous speed, acceleration and optionally the inertial mass of the moving machine part (i.e., that of the slide of the Z advance mechanism 16 as well as the cavity-sinking electrode 10), which cause an inertial force during acceleration that produced deformation of the Z advance train. This also leads to a slight difference between the position measured value $Z_{pos1}$ and $Z_{pos2}$, without, however, indicating a disturbance by the computer unit 35 and initiating any special measures in the drive system.

According to another example, the aforementioned collision protection method is combined with a preventive collision protection method. For this purpose, on the front end of the Z advance mechanism 16, an inductive or capacitive proximity sensor 71 schematically depicted in FIG. 1 is provided, which is connected to the Z axial control unit 30 and during machining monitors the work space continuously for any collision with obstacles in the work space and causes rapid disengagement of the Z advance movement on surpassing a stipulated minimum distance. In a preferred method, this active collision protection is used as primary protection (i.e., the collision sensing based on the aforementioned difference determination is only activated when the active collision protection fails or does not function for any other reason such as dead angle, for example).

Figure 2:
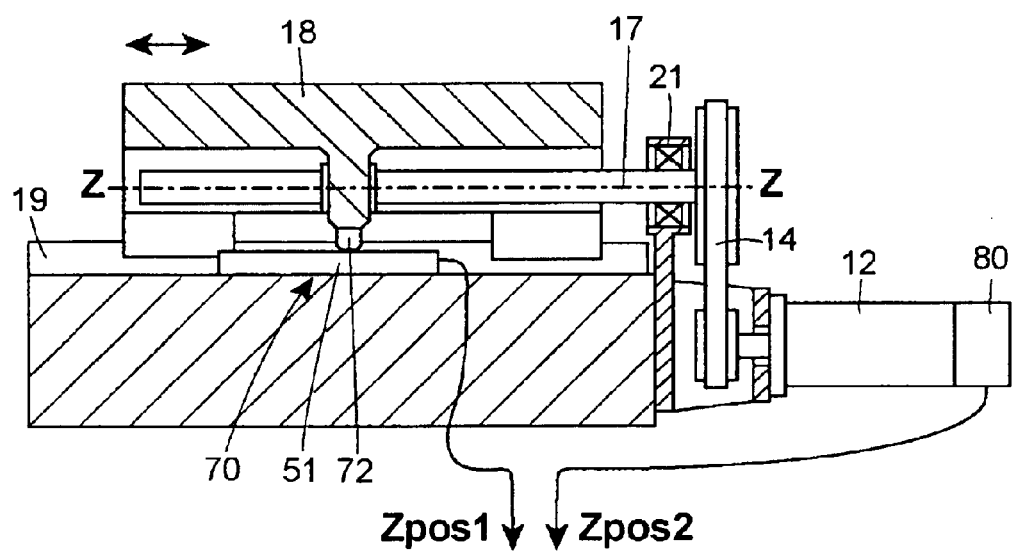
FIG. 2 shows a detail view of a practical example for one of the X, Y or Z drive systems in FIG. 1.

FIG. 2 shows a detailed view of a drive system, as was described in FIG. 1 for the Z advance movement. Components that correspond to each other therefore carry the same reference numbers. According to FIG. 2, a servomotor 12 drives the machine part being moved via an advance spindle 17, namely a slide 18. The slide 18 is movable on a guide rail 19 on a section of the machine frame at rest relative to it in the direction of the marked double arrow, for example, the Z main axial direction. To convert the rotational movement of servomotor 12 to a linear movement of slide 18, the servomotor 12 is coupled to the advance spindle 17 on the output side via a toothed belt 14. The advance spindle 17 is firmly mounted on one side in a ball screw 21 with prestressed oblique ball bearings.

A rotation angle sensor 80 is provided directly on the servomotor 12 for indirect position measurement (e.g., a resolver, or an optical incremental encoder). In addition, a linear measurement system 70 is arranged parallel to the advance spindle 17 (i.e., parallel to the travel path of slide 18). This includes an elongated scale 51, which is provided with scale lines or a marking pattern comprising diffraction gratings and a scanner 72, for example, in the form of a vertical resonator laser, which is mechanically connected to slide 18. When each scale line is traversed, a position signal $Z_{pos1}$ is sent by the length measurement system 70 to the axial control unit of the cavity-sinking machine. The indirect measurement of the corresponding position $Z_{pos2}$ occurs with the rotation angle sensor 80 on servomotor 12. The position measured values $Z_{pos1}$ and $Z_{pos2}$ are used for disturbance sensing in the drive system, especially for collision determination, as described previously in conjunction with FIG. 1.

Although certain apparatuses constructed in accordance with the teachings of the presently disclosed system have been described herein, the scope of coverage of this patent is not limited thereto. On the contrary, this patent covers all embodiments of the teachings of the presently disclosed method and apparatus fairly falling within the scope of the appended claims either literally or under the doctrine of equivalents.

What is claimed:

1. A method for disturbance sensing in a drive system of a numerically controlled machine tool, in which at least one drive motor for positioning a machine part is coupled via one or more transmission elements to the machine part, the method comprising the steps of:

a) measuring a position of a moving machine part directly on the machine part and also indirectly at at least one location in a transmission chain;

b) comparing the direct and indirect position measured values to reach a difference value; and c) comparing the difference value to a prescribed threshold value during operation of the machine tool to determine the occurrence of a disturbance, the disturbance indicated if the difference value exceeds the prescribed threshold value, the disturbance indicative of at least one of a dynamic error of the drive motor, a dynamic error of one or more of the transmission elements, or a collision between the moving machine part and an object, the comparison performed with consideration of actual operating conditions.

2. A method as defined in claim 1, wherein the indirect measurement of the position of the machine part being moved is conducted on the drive motor.

3. A method as defined in claim 1, wherein the difference value is compared with one or more prescribed threshold values, the one or more prescribed threshold values being determined with consideration of actual operating conditions, and wherein predetermined measures are automatically initiated on at least one of reaching and surpassing the one or more prescribed threshold values.

4. A method as defined in claim 3, wherein the actual operating conditions include at least one of inertial forces during acceleration of the moving machine part, process forces of work place machining and friction forces in the drive system.

5. A method as defined in claim 3 wherein a calibration procedure is performed to determine machine-specific threshold values in which machine-specific standard disturbance situations are run.

6. A method as defined in claim 1, wherein disengagement of at least one of advance movement of the moving machine part and reversal movement of the moving machine part is initiated directly after collision sensing.

7. A method as defined in claim 1 wherein possible damage is evaluated after collision sensing with consideration of at least one of a determined collision direction, a collision speed or a collision depth and correction is activated to prevent damage when necessary.

8. A method as defined in claim 1, further including a preventive collision protection method used in combination with collision sensing.

9. A method as defined in claim 8, wherein the machining process is monitored by an active collision protection system and collision monitoring is initiated by difference formation of the direct and indirect position measured values only upon failure of the active collision protection system.

10. A device for disturbance sensing in a drive system of a numerically controlled machine tool in which at least one drive motor for positioning of a machine part being moved is coupled via one or more transmission elements to the machine part, the device comprising:

a) a direct measurement system connected to a machine part being moved by the least one drive motor configured to measure an actual position of the machine part being moved;

b) an indirect measurement system configured to indirectly determine a position of the moving machine part located at at least one location in a transmission chain; and c) a control unit configured to compare determined position measured values to determine a difference value and to determine whether the difference value is indicative of the occurrence of a disturbance by determining whether the difference value fulfills a prescribed criterion, the control unit further configured to perform the comparison during operation of the machine tool, such that the disturbance is indicated upon fulfillment of the prescribed criterion.

11. A device as defined in claim 10, wherein the direct measurement system is a linear measurement system connected to the machine part being moved.

12. A device as defined in claim 11, wherein the linear measurement system is a phase grating length measurement system.

13. A device as defined in claim 11, wherein the linear measurement system has a stationary phase grating scale and a vertical resonator laser scanning sensor coupled to the machine part being moved.

14. A device as defined in claim 10, wherein the indirect measurement system is a rotation angle sensor that is either directly or indirectly coupled to a rotor shaft of the drive motor.

15. A device as defined in claim 10, further comprising:

an active collision protection system used in conjunction with the device for disturbance sensing, wherein the device for disturbance sensing is activated when one of a defect and a failure of the active collision protection system occurs.

16. A device as defined in claim 15 further comprising:

a proximity sensor connected to the moving machine part and configured for use as the active collision protection system.

17. A device as defined in claim 15, further comprising:

an image processing system configured for use as the active collision protection system and further configured to record the size and position of elements in a work space of the machine tool.

18. A method for disturbance sensing in an operating drive system of a numerically controlled machine tool, the machine tool including a drive motor operatively coupled to a machine part by a transmission chain, the method comprising the steps of:

a) taking a first position measurement of the machine part, the first position measurement taken directly at the machine part and being indicative of a first X position, a first Y position, and a first Z position in a Cartesian coordinate system;

b) taking a second position measurement of the part, the second position measurement taken indirectly at a location in the transmission chain and being indicative of a second X position, a second Y position, and a second Z position in the Cartesian coordinate system;

c) comparing the first and second position measurements during a machining operation to arrive at a position difference value; and d) using the position difference value to indicate the appearance of a disturbance with consideration of the actual operating conditions in the event the difference value exceeds a prescribed criterion.

* * * * *